June 27, 1967  J. S. SWEARINGEN  3,327,977
MACHINE SUPPORT
Filed Sept. 23, 1965
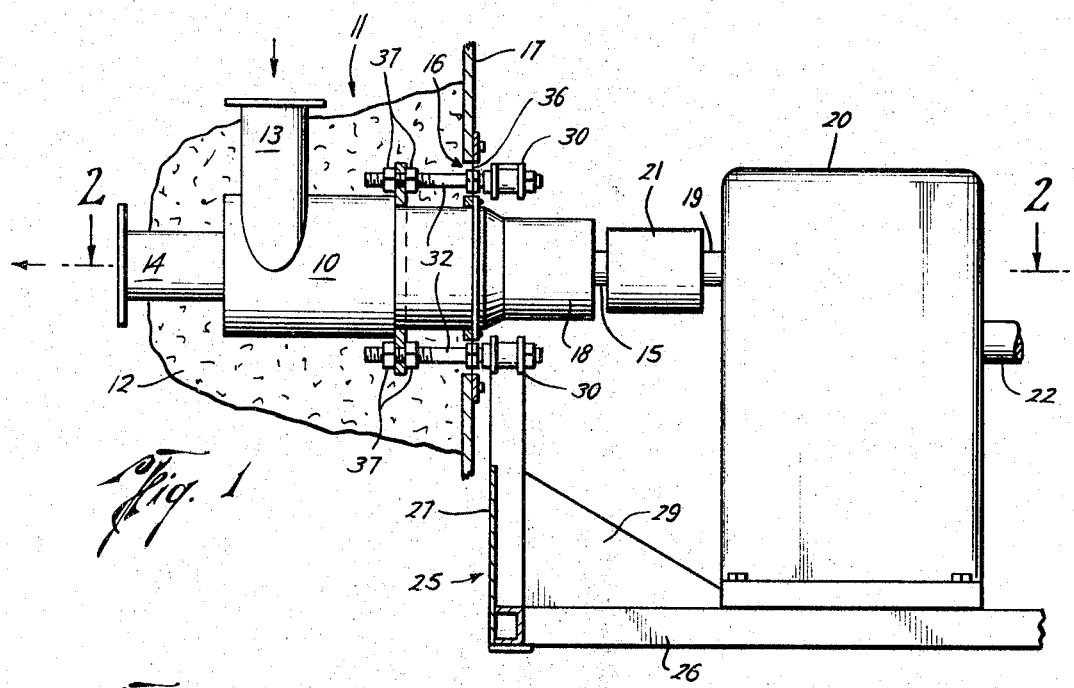
Fig. 1
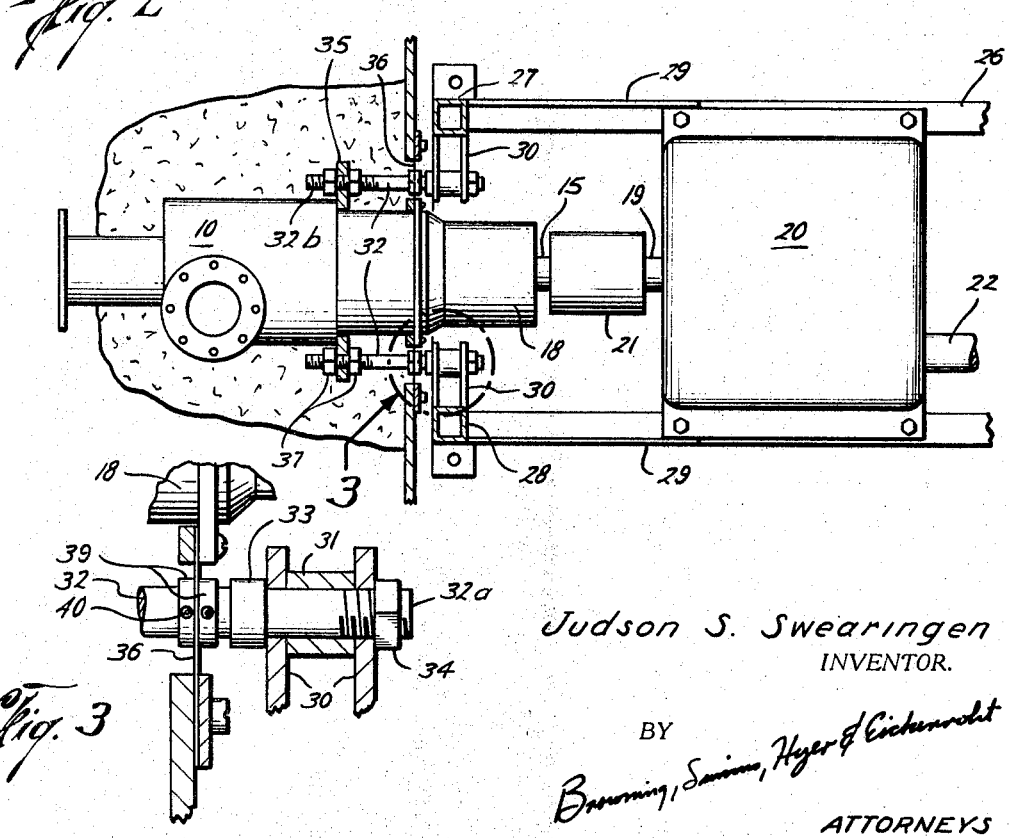
Fig. 2
Fig. 3
Judson S. Swearingen
INVENTOR.
BY
ATTORNEYS

United States Patent Office 3,327,977
Patented June 27, 1967

3,327,977
MACHINE SUPPORT
Judson S. Swearingen, 2235 Carmelina Ave.,
Los Angeles, Calif. 90064
Filed Sept. 23, 1965, Ser. No. 489,686
8 Claims. (Cl. 248—2)

This invention relates to machine supports generally, and in particular, to a support for a machine that is operatively connected to a second machine through a shaft and which is located in an environment having a substantially different operating temperature from the environment in which the second machine is located.

Whenever two machines or devices are connected together by a shaft, it is desirable to support these machines so they will not impose any lateral or axial forces on the shaft. This is not difficult to do when the two machines are operating in the same atmosphere or environment. When the two machines are in separate environments with substantially different temperatures, however, supporting the machines to avoid imposing lateral or axial forces on the shaft is more complex.

The problem is especially difficult where turbo-expanders are employed in gas streams to convert the compression energy in the gas into refrigeration plus recoverable power. The temperature reduction is obtained by the expansion of the gas through the turbine. For power recovery the turbine is connected through a shaft to drive some other machine, such as, an electrical generator or a compressor. The turbo-expander, usually, is located in a cold box to keep the heat losses therefrom to a minimum. Also, the cold box is necessary to allow a moisture free atmosphere to be maintained around the turbo-expander to prevent condensation, since the temperature in the cold box may be in the order of 250° F. below zero. The machines being driven by the turbo-expander are located outside the cold box and, therefore, operate some 300–350° F. above the temperature of the environment of the turbo-expander.

When they are being installed, however, the temperature of the machines and their supports are the same. Thus, the dimensions of the support for the turbo-expander will not be the same when it is operating as when it was installed. If the shafts of the two machines were in alignment when they were first installed, such changes in the dimensions of one of the supports can result in misalignment. This is particularly troublesome with turbo-expanders, due to the temperature at which they operate and because they operate at very high speeds, which makes shaft alignment particularly important to the life of the bearings supporting the shaft and to the coupling between the shafts. Alignment is particularly critical in this type of equipment where the shaft operates at very high r.p.m., which may be in the order of 16,000 r.p.m.

Therefore, it is an object of this invention to provide a support for a machine that will not tend to cause misalignment of the shaft of the machine with respect to its bearing support even though the temperature of the environment of the machine changes substantially.

It is another object of this invention to provide a support for a turbo-expander, which is operatively connected by a shaft to a second machine, that will not impose any unbalanced lateral forces on the shaft even though the temperature of the environment of the turbo-expander changes substantially from the temperature of the environment of the second machine.

It is another object of this invention to provide a support for a turbo-expander that can contract and expand due to temperature changes without moving it out of axial alignment with another machine with which the turbo-expander is connected by a shaft and which is located in a separate environment having a substantially different temperature.

It is another object of this invention to provide a turbo-expander, which is located in a cold box with its output shaft extending through the cold box to drive another machine, with a support that includes a plurality of elongated members that extend through the wall of the cold box, parallel to the shaft to support the turbo-expander equally between them and to bend equally toward the shaft as the temperature in the cold box drops without imposing any unbalanced lateral forces on the shaft.

It is another object of this invention to provide such a support for a turbo-expander in which the elongated support members can be easily sealed to the wall of the cold box through which they extend.

It is another object of this invention to provide such a support for a turbo-expander in which the elongated members contract in length at the same rate as the shaft due to temperature changes in their environment.

It is yet another object to provide a support for a turbo-expander that will allow adjustments to be made in the alignment of the shaft of the turbo-expander with that of the other machine.

It is another object of this invention to provide a support for a turbo-expander in a cold box in which a large portion of the support is located outside the cold box.

These and other objects, advantages and features of the invention will be apparent to those skilled in the art from a consideration of this specification and attached drawings.

The preferred embodiment of the invention will be described below in connection with the attached drawings in which:

FIGURE 1 is a side view of the support of this invention holding a turbo-expander in axial alignment with the input shaft of a gear reducer through which another machine, such as a generator, can be driven;

FIGURE 2 is a sectional view taken along line 2—2 of FIGURE 1; and

FIGURE 3 is a sectional view on enlarged scale of the portion encircled in FIGURE 2.

Turbo-expander 10, as shown in FIGURES 1 and 2, is located in cold box 11. Usually, the cold box is filled with insulation 12 to insulate the equipment and piping in the cold box from the heat of the environment. outside. To keep down condensation usually, the cold box is filled with a moisture-free gas, such as dry air or dry nitrogen at a pressure slightly above the pressure of the atmosphere around the box. The turbo-expander has inlet 13, through which the gas enters, and an outlet 14, through which it leaves after expanding therein to reduce its temperature and also to produce useful work by imparting torque to output shaft 15. The cold box is provided with an opening 16 in its front wall 17 through which the output shaft of the turbo-expander and bearing housing 18 extends. Preferably, the bearing housing extends at least partially out of the cold box, so that the lubricant for the bearings can operate in a warmer environment. Output shaft 15 is connected to input shaft 19 of gear reducer 20 through coupling 21. Output shaft 22 of the speed reducer is connected to a machine, such as a compressor (not shown).

A support is provided to hold the turbo-expander in axial alignment with the input shaft of the gear reducer even though the temperature of the environment of the turbo-expander, when operating, is substantially different from the temperature of the environment of the speed reducer. The support includes base 25 which comprises a rectangular bottom frame 26, formed of structural members, and two support posts 27 and 28, which extend upwardly from the bottom frame. Gussets 29 serve to rigidly connect the support posts to the bottom frame. Each support post has two vertically spaced pairs of support arms 30. Located between the outer end of each pair of arms are bushings 31 that serve to hold the arms spaced apart. The arm serves to rigidly connect the support members to the base.

A plurality of support members preferably comprising elongated round bars 32, are attached to the base and positioned to extend into the cold box to support the turbo-expander. Each support bar is connected to a pair of arms 30 as shown in FIGURE 3. An opening is provided in both arms and the bushing through which end 32a of the bar extends. The end is threaded and provided with an enlarged section 33. This provides a shoulder to engage the outside surface of one of the arms. Tightening nut 34 then rigidly anchors the support bar to the base. Arms 30 are positioned on the support posts so that when the support bars are mounted thereon, they will be symmetrically positioned around shaft 15 and they will extend into the cold box parallel to shaft 15. Also, the arms are positioned to equally space the bars from the shaft.

Means are provided to connect the ends of the support bars that are in the cold box to the turbo-expander. Mounting plate 35 is attached to the turbo-expander and provided with holes through which the support bars extend. Ends 32b of the support bars are threaded and nuts 37 are located on each side of plate 35 to rigidly attach the bars to the plate. Also, by using two movable nuts, minor adjustments in the alignment of the turbo-expander with the output shaft of the speed reducer can be made, when the machines are being assembled.

Thus, with this arrangement, the weight of the turbo-expander is supported by the support bars, which, in turn, are supported by base 25. In the embodiment shown, speed reducer 20 is mounted on base 25, also. This is particularly convenient, since it allows a unitized support to be provided for both machines. Also the weight of the speed reducer helps offset the weight of the turbo-expander, which is tending to tip the base over. The base cannot be extended under the turbo-expander in most cases because the cold box extends to the floor. The base can be extended, and usually is, to also provide support for the generator or whatever machine is being driven by the output shaft of the speed reducer.

After the tubo-expander is in place in the cold box, opening 16 therein must be closed. Diaphragm 36 of a flexible material such as leather or rubber is used for this purpose. The outer edge of the diaphragm is bolted to front wall 17 of the cold box and the inner edge is bolted to bearing housing 18, as shown in FIG. 3. Holes are provided in the diaphragm to permit the passage of the support bars and clamp means are provided to provide a seal between the diaphragm and the bars. In the embodiment shown, rings 39 are located on the bars on opposite sides of the diaphragm. The rings are in sliding and sealing engagement with the support rod. Each ring is provided with a set screw 40, so that after the diaphragm is in place, the rings can be brought into engagement with the diaphragm and held in sealing engagement therewith by the set screws. Preferably, the diaphragm has sufficient slack or resiliency to permit the support bars and bearing housing to move relative to the box without destroying the seal therebetween.

Once the turbo-expander goes into operation, the temperature in the cold box will drop considerably. As stated above, these turbo-expanders operate normally at some 250° F. below zero. With an ambient temperature around the speed reducer of 70° to 100° F., the temperature spread between the two environments is substantial. As the temperature drops in the cold box, all of the metal members therein will contract, including mounting plate 35.

As the mounting plate contracts it will exert a force on each bar urging it toward the shaft and an equal force on the shaft urging it toward the bar. If these forces are located so that their resultant is zero, then no unbalanced lateral force will be imposed on the shaft.

With the support bars positioned as shown, symmetrically arranged around the shaft and equally spaced therefrom, the force exerted on each bar will be equal. Also, each of these forces will be directly offset by the force exerted on the bar located diametrically opposite. Then with each bar being substantially the same length between the base and the support plate, of the same diameter so each bar has the same section modulus resisting the bending of the bar by the force, and with each bar having the same modulus of elasticity, each bar will flex toward the shaft the same amount and no misalignment of the shaft will occur. Usually, of course, the bars are made of the same material.

Various other arrangements of the bars could be used. For example, the bars need not all be the same size, as long as those diametrically opposite are the same size. They also could be hollow instead of solid. Also, an uneven number could be used if they are arranged symmetrically so that each bar flexes an equal amount toward the shaft and the resultant of the forces imposed on the shaft is zero.

The bars need not have the same cross section either, as long as they have the same section modulus resisting the forces imposed by the contracting mounting plate.

In addition to providing support for the turbo-expander that will not cause lateral movement of the shaft due to changes in temperature of the environment of the machine, the support provided by this invention also can be arranged to relieve the shaft of any axial loading due to temperature changes in its environment. As the temperature decreases in a cold box the shaft 15 will, of course, shrink in length. Support bars 32, however, can be designed to shrink in length at the same rate as the shaft, and no axial loads will be imposed on the shaft because of changes in the temperature of its environment.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination a turbo-expander and a driven machine, a drive shaft driven by the turbo-expander and driving the machine; a cold box enclosing the turbo-expander with the drive shaft extending therefrom; bearing means rotatively mounting the shaft; a housing supporting the bearing means, means outside the cold box providing a rigid base; and means connected to the latter means and extending through the cold box, supporting the housing and imposing no resultant force on the housing tending to shift the housing due to changes in the size of the housing resulting from temperature changes in the cold box whereby temperature changes do not affect the alignment of the bearing means.

2. The combination of claim 1 in which the cold box is provided with an opening through which the shaft and the bearing housing supporting means extend, a flexible diaphragm to close the opening, said diaphragm having openings through which the bearing housing and housing supporting means extend, and means providing a seal between the diaphragm and the housing and between the diaphragm and the housing supporting means.

3. The combination of claim 2 in which the housing supporting means comprise a plurality of elongated bars that extend through the diaphragm with one end rigidly attached to the base means and the other end rigidly attached to the housing, said bars being arranged in pairs around the shaft and parallel thereto with the bars of each pair being located on diametrically opposite sides of the shaft, the bars of each pair having substantially the same length, modulus of elasticity, and moment of inertia resisting bending toward the shaft.

4. The combination of claim 2 in which the housing supporting means comprise a plurality of elongated bars that extend through the diaphragm with one end rigidly attached to the base means and the other end rigidly attached to the housing, said bars being parallel to and equally spaced from the shaft and each other, said bars having substantially the same length, modulus of elasticity, and moment of inertia resisting bending toward the shaft.

5. A support for a first machine having a rotating shaft operatively connected to the rotating shaft of a second machine through a wall, said first machine being located in an environment having a temperature substantially different from the temperature of the environment of the second machine, said support comprising, a base to be located in the environment of the second machine, a plurality of support bars for extending generally parallel to the shaft symmetrically therearound, first means connecting one end of each bar to the base for the bars to be supported by the base with the other ends of the bars extendable through said wall into the environment of the first machine, second means for connecting the latter ends of the bars to the first machine to transmit the weight of the machine to the bars, said bars being of substantially equal length between the two connecting means and made of a material of equal modulus of elasticity, and equal section moduli resisting the force exerted thereon by the weight of the first machine and equal section moduli resisting the force exerted thereon by the change in temperature of the connecting means.

6. The support of claim 5 in which the second connecting means is a plate provided with openings through which the portion of the bars extending through said openings are threaded and provided with nuts on each side of the connecting means for adjusting the alignment of the first machine with respect to the second.

7. The support of claim 5 including a flexible partition for locating between the two machines having openings through which the support bars extend, and which is further provided with means encircling and in sliding, sealing, engagement with each bar and located on opposite sides of the partition to clamp the partition therebetween and provide a seal between each bar and the partition.

8. In combination a turbo-expander and a driven machine, a drive shaft driven by the turbo-expander and driving the machine, a cold box enclosing the turbo-expander having an opening in the wall thereof through which the shaft extends, said turbo-expander including a bearing housing and a bearing in the housing supporting the shaft, a base located outside the cold box, a plurality of elongated bars made of the same material with circular cross sections of the same diameter, said bars having one end rigidly attached to the base and extending through the opening in the wall parallel to the shaft, said bars also being equally spaced from the shaft and arranged symmetrically around the shaft with each bar spaced equally from each adjacent bar, a mounting plate having a central opening in which the turbo-expander is mounted, said plate having a plurality of openings equally spaced from the shaft through which the other end of the bars extend, said ends of the bars being threaded and provided with nuts on each side of the plate to allow the position of the turbo-expander to be adjusted, a flexible diaphragm closing the opening in the cold box with openings through which the bearing housing and the bars extend, and means for providing a seal between the diaphragm and the bars and between the housing and the diaphragm to close the cold box.

References Cited

UNITED STATES PATENTS

| | | | |
|---|---|---|---|
| 2,126,696 | 8/1938 | Bates | 248—2 X |
| 2,356,721 | 8/1944 | Hagemann | 60—95 |
| 2,414,975 | 1/1947 | Noble | 248—16 |
| 2,461,659 | 2/1949 | Rouse | 248—2 X |
| 2,643,078 | 6/1953 | Brown et al. | 248—2 |

JOHN PETO, *Primary Examiner.*